(12) United States Patent
Turnquist et al.

(10) Patent No.: US 6,692,228 B2
(45) Date of Patent: Feb. 17, 2004

(54) ROTOR INSERT ASSEMBLY AND METHOD OF RETROFITTING

(75) Inventors: Norman Arnold Turnquist, Sloansville, NY (US); Christopher Edward Wolfe, Niskayuna, NY (US); Frederick George Baily, Ballston Spa, NY (US); John Francis Nolan, Latham, NY (US); George Ernest Reluzco, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 77 days.

(21) Appl. No.: 10/063,045

(22) Filed: Mar. 14, 2002

(65) Prior Publication Data

US 2003/0185675 A1 Oct. 2, 2003

(51) Int. Cl.$^7$ .................................. F01D 5/08
(52) U.S. Cl. ...................... 415/174.2; 29/889
(58) Field of Search ................. 415/177, 178, 415/174.2, 170; 416/95; 29/401.1, 889, 889.1

(56) References Cited

U.S. PATENT DOCUMENTS 5,997,248 A * 12/1999 Ghasripoor et al. ...... 415/173.4
6,168,377 B1 * 1/2001 Wolfe et al. ............. 415/174.2

OTHER PUBLICATIONS

A.D. Dimarogonas, Newkirk Effect: Thermally Induced Dynamic Instability of High–Speed Rotors, ASME Publication, pp. 1–11.

* cited by examiner

Primary Examiner—Edward K. Look
Assistant Examiner—Kimya N McCoy
(74) Attorney, Agent, or Firm—William E. Powell, III; Patrick K. Patnode

(57) ABSTRACT

An insert assembly is provided for a rotary machine wherein the rotary machine comprises a rotor and a casing. The rotor comprises a generally longitudinally-extending axis. The casing is generally coaxially aligned with the axis. The casing circumferentially surrounds and is radially spaced apart from the rotor. The insert assembly comprises a channel circumferentially disposed on the rotor and an insert circumferentially disposed in such channel such that the insert assembly is configured to thermally isolate frictional heat from the rotor to the insert.

25 Claims, 3 Drawing Sheets

ROTOR INSERT ASSEMBLY AND METHOD OF RETROFITTING

BACKGROUND OF INVENTION

The present invention relates generally to rotary machines, and more particularly to a rotor insert assembly for rotary machines such as steam and gas turbines.

Rotary machines include, without limitation, turbines for steam turbines and compressors and turbines for gas turbines. A steam turbine has a steam path that typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, any gas path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

It is known in the art of rotary machines that contact between stationary and rotating parts, for example, a brush seal and a rotor in a steam turbine, typically results in temporary deformation of the rotor due to heat generated by the frictional forces created by the rubbing of the brush seal against the rotor. As a result of such deformation, the heating of the rotor and the direct forces caused by the brush seal typically cause the rotor to become unbalanced thus producing a "wobbling" effect on the rotor. The wobbling effect increases the vibration in the rotary machine thereby enlarging the gap defined between the stationary and rotating parts. In some instances, the deformation typically causes a scoring of the rotor thus resulting in costly repairs to the rotor and the brush seal. Consequently, the efficiency of the rotary machine decreases due to the increase in gas or steam leakage through the gap created by either the wobbling effect or the scoring of the rotor.

Accordingly, there is a need in the art for a rotary machine having improved thermal control between stationary and rotating components.

SUMMARY OF INVENTION

One embodiment of the present invention comprises an insert assembly for a rotary machine wherein the rotary machine comprises a rotor and a casing. The rotor comprises a generally longitudinally-extending axis. The casing is generally coaxially aligned with the axis. The casing circumferentially surrounds and is radially spaced apart from the rotor. The insert assembly comprises a channel circumferentially disposed on the rotor and an insert circumferentially disposed in such channel such that the insert assembly is configured to thermally isolate frictional heat from the rotor to the insert.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
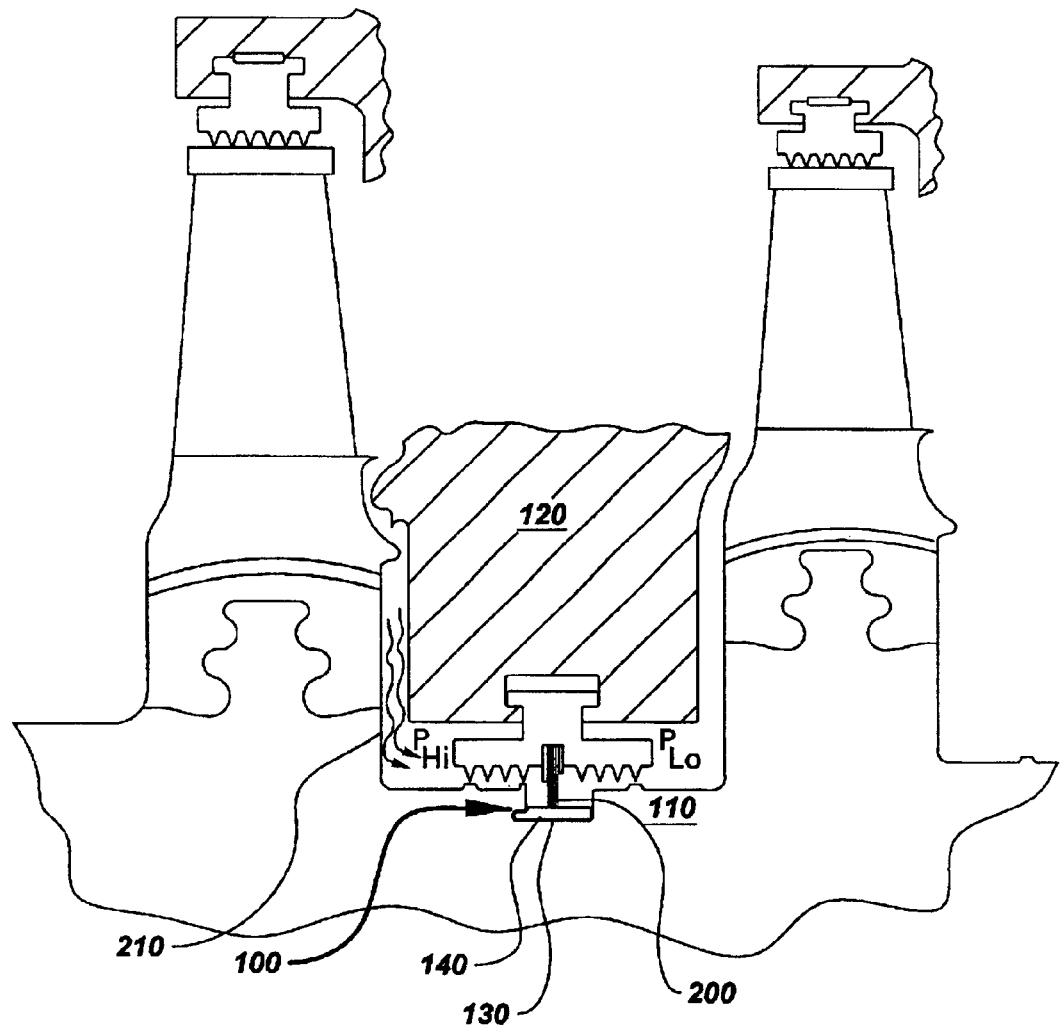
FIG. 1 is a schematic, cross sectional view of an insert assembly in accordance with one embodiment of the present invention.

Referring now to the drawings, FIG. 1 schematically shows a rotary machine (only a portion of which is shown in the Figure) in which the rotary machine comprises a rotor 110, for example a turbine rotor, and a casing 120, for example a turbine casing. The rotor 110. for example, without limitation, is typically constructed as a single monolithic rotor or as two or more longitudinally attached rotor segments. The casing 120, without limitation, is typically constructed as a single monolithic casing or a plurality of longitudinally-attached casing segments. The term "rotor", as used herein, includes a shaft, disk, wheel, and the like. The rotor 110 comprises a generally longitudinally extending axis, and the casing 120 is generally coaxially aligned with the axis. The casing 120 circumferentially surrounds and is radially spaced apart from the rotor 110. In addition, the rotary machine comprises an insert assembly 100 for thermally isolating frictional heat from the rotor 110. The frictional heat is typically created between the stationary and rotating parts in a turbine, for example, a (meaning at least one) brush seal 200 and the rotor 110 in a turbine. The term "thermally isolating", as used herein, refers to the ability of an insert 140, disposed along the circumferential length of the rotor 110 and disposed adjacent to the brush seal 200, to primarily absorb and dissipate unwanted heat from the rotor 110 through the use of materials capable of withstanding distortion at high temperatures (discussed below). Through the use of such materials, the heat transferred to the rotor 110 from the insert 140 is negligible. The term "adjacent", as used herein, refers to the position of the insert 140 with respect to the brush seal 200 in which the insert 140 is typically disposed opposite the brush seal 200 and in contact with the fibers of brush seal 200.

Figure 2:
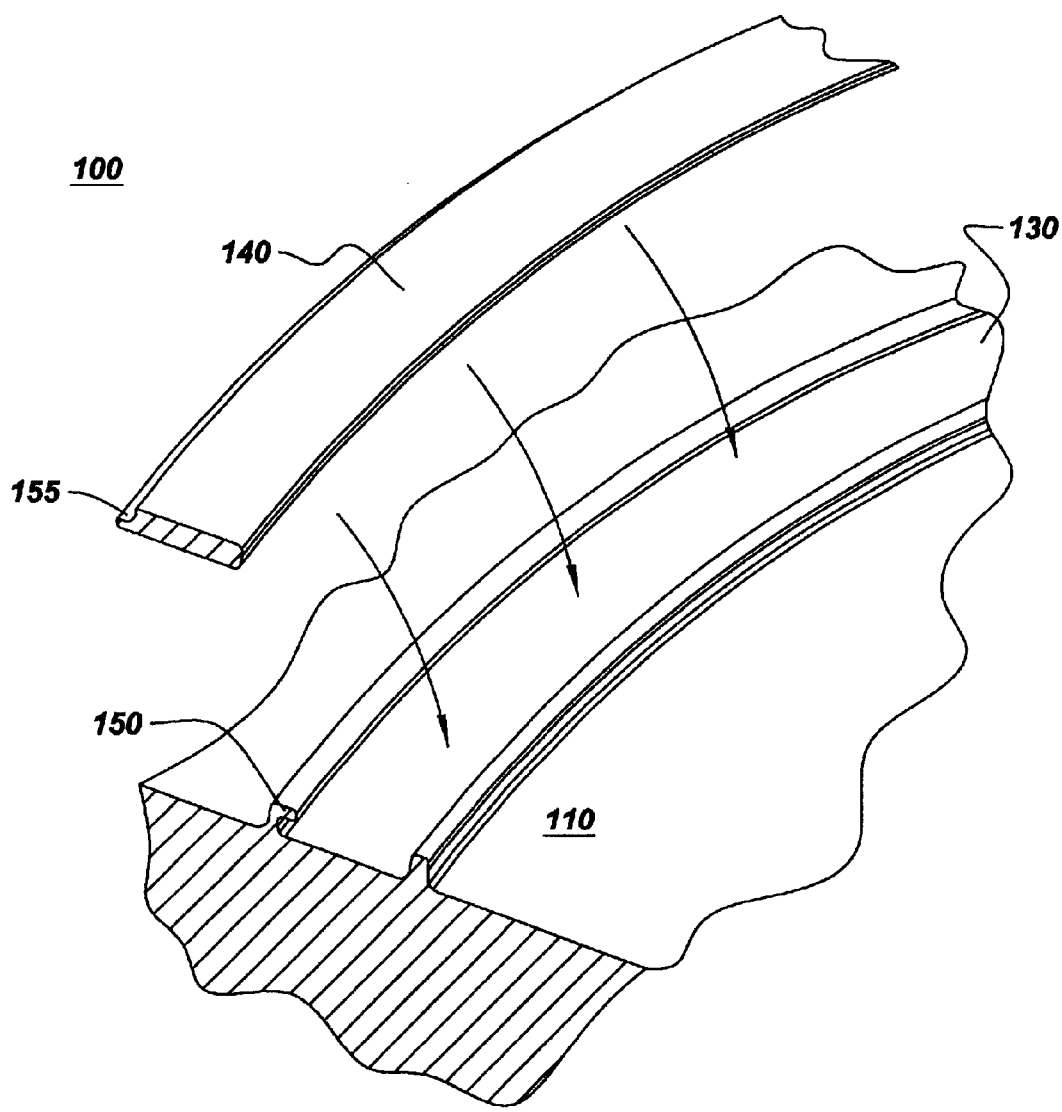
FIG. 2 is a perspective view of the insert assembly of FIG. 1.

The insert assembly 100 comprises a channel 130 circumferentially disposed on the rotor 110 and the insert 140 circumferentially disposed in the channel 130. It will be appreciated that the terms "a channel" and "an insert", as used herein, mean at least one channel 130 and at least one insert 140 circumferentially disposed along the length of the rotor 100. In one embodiment as shown in FIG. 2, channel 130 comprises a (meaning at least one) lip 150 for securing the insert 140 therein. In one embodiment, lip 150 is disposed over the entirety of channel 130. In an alternative embodiment, lip 150 is disposed over less than the entirety of channel 130. In an exemplary embodiment, insert 140 comprises a (meaning at least one) ledge 155 extending radially therefrom. In this embodiment, insert 140 is disposed within channel 130 by positioning ledge 155 under lip 150. In a further embodiment, insert 140 is a continuous insert so as to be disposed within the channel 130 as a single unit around the circumference of the rotor 110. Here, the continuous insert typically comprises a "c" profile having two ends, where one end of the insert 140 wraps around the circumference of the rotor and is secured to the other end. In yet another embodiment, insert 140 comprises multiple insert segments disposed circumferentially in the channel 130 around the rotor 110.

Figure 3:
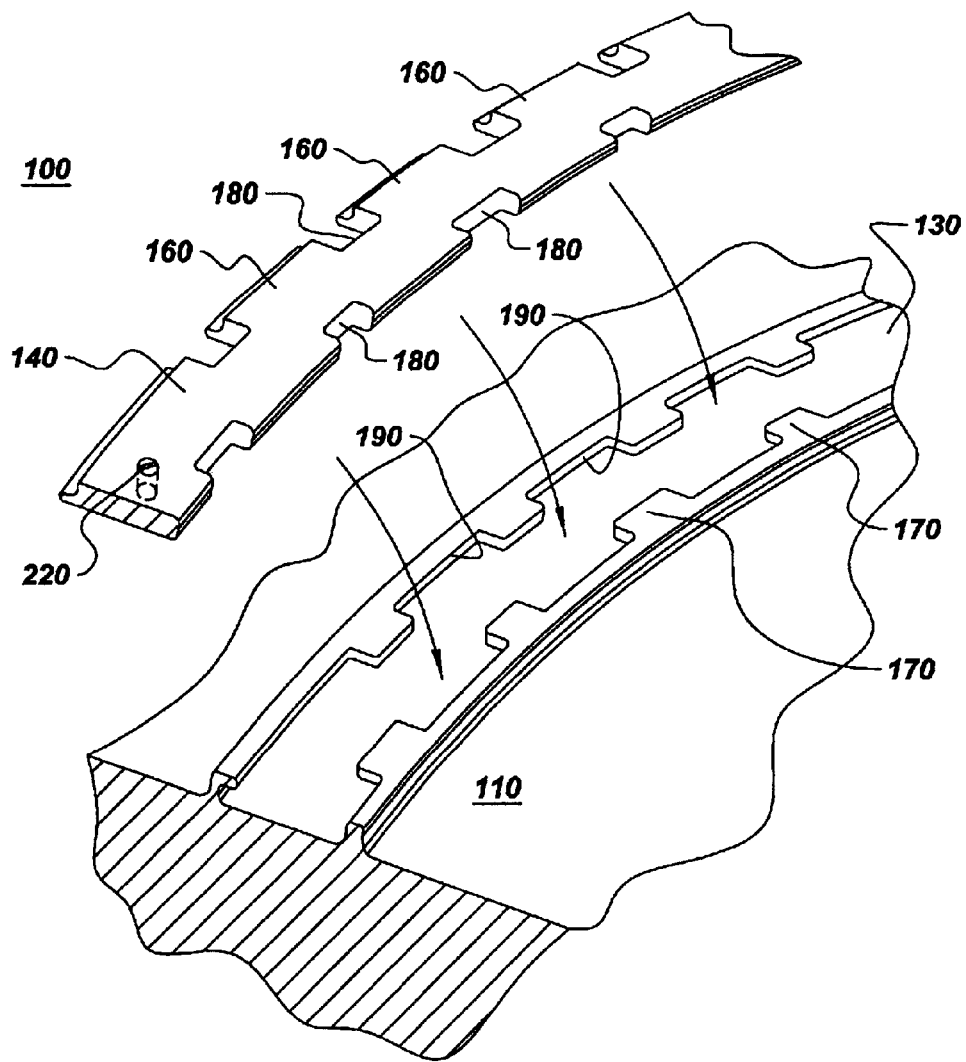
FIG. 3 is a perspective view of the insert assembly of FIG. 1 in accordance with another embodiment of the present invention.

In another embodiment, the insert 140 comprises a plurality of insert tabs 160 extending radially therefrom wherein the insert tabs 160 are configured to be matingly disposed with a plurality of rotor tabs 170 extending radially from the channel 130 (see FIG. 3). The term "matingly disposed", as used herein, refers to structural connection between the insert 140 and the channel 130 through a plurality of insert cavities 180 defined between respective ones of insert tabs 160 and a plurality of rotor cavities 190 defined between respective ones of rotor tabs 170. It will be appreciated that the shapes (in plan view) of insert tabs 160 and rotor tabs 170 typically include square, circular, rectangular, or irregular shapes. In one exemplary embodiment, insert 140 is radially disposed in the channel 130 so that each of the plurality of insert cavities 180 are disposed in each of the plurality of rotor tabs 170. In another exemplary embodiment, insert 140 is radially disposed in the channel 130 so each of the plurality of insert cavities 180 are disposed in each of the plurality of rotor tabs 170 and insert 140 is then displaced longitudinally so that each of the plurality of insert tabs 170 are located under each of the plurality of rotor tabs 170 so as to affix the insert 140 to the rotor 110. As used herein, directional words such as, for example, "thereon", "therein", "on", "in", "over", "above", and "under" are used to refer to the relative location of elements of insert assembly 100 as illustrated in the Figures and are not meant to be limitations in any manner with respect to the orientation or operation of insert assembly 100. It will be appreciated that other methods to affix the insert 140 to the rotor 110 may be used, for example, without limitation, using welding and brazing methods as well as using mechanical fasteners and the like. FIG. 3 shows a (meaning at least one) fastener 220, for example a screw, disposed within the insert 140.

It is known in the art that round rotating parts of rotary machinery, there are stationary components such as packings, seals, oil deflectors and the like. In a turbine, for example, these stationary components are typically used to separate the flow of a fluid medium 210 (see FIG. 1) in a fluid path, for example, gas or steam, that is passed between the rotor 110 and the casing 120. It will be appreciated, however, that fluid medium 210 in the fluid path flows from the high pressure side, designated "PHi" towards the low pressure side, designated "PLo", i.e., from the left to the right of drawing FIG. 1.

In conventional turbomachinery, the brush seal 200, for example, rubs against the rotor 110 and generates frictional heat that typically deforms the brush seal 200, the rotor 110, or both. If the rubbing on the rotor 110 is non-uniform, the rotor 110 typically becomes unbalanced and temporarily deformed due to the variation in heating around the circumference of the rotor 110. The deformation to the rotor 110, for example, intensifies the vibration in the turbine and thereby increases the flow of fluid medium 210 in the gap defined between the casing 120 and the rotor 110. As a result, the efficiency of the turbine is lowered, thereby resulting in an increase in fuel costs.

In order to increase the efficiency of the turbine, one exemplary embodiment includes the insert 140 comprising a (meaning at least one) high temperature material such as a nickel-based alloy. One specific example of a high temperature material is a nickel-chromium-molybdenum-niobium alloy. The nickel-based alloy resists a wide range of severely corrosive environments and is especially resistant to pitting and crevice corrosion. Insert 140 is also capable of withstanding distortion effects caused by the frictional heating discussed above. Furthermore, insert 140 acts a heatsink and is able to expand at a different rate from the rotor 110 due to the different coefficients of thermal expansion since the rotor is typically made of CrMoV steel, NiCrMoV steel or 12 Cr steel. As such, the insert 140 is able to absorb and dissipate unwanted heat from the rotor 110. In addition, the insert 140 typically expands without imparting axial loads on the body of the rotor 110 and the vibration and deformation of such rotor 110 is minimized due to the insert 140 properties described above.

In another embodiment, insert assembly 100 is disposed in a rotary machine such as an electric generator or, more specifically, a hydrogen cooled electric generator. In a further embodiment, the insert assembly 100 is disposed in turbomachinery such as a centrifugal compressor, a steam turbine, or a gas turbine typically used in aircraft engines or used by power utility companies. It is noted that the invention is not limited to the examples expressed herein and is useful in association with any machine experiencing a pressure drop during machine operation. In addition, the insert assembly 100 is not limited to a moving or rotating portion of the machine and can be employed between two components having no relative motion.

A method of retrofitting the insert assembly 100 in the turbine comprises forming the channel 130 on the rotor 110 and disposing the insert 140 within the channel 130 wherein the insert 140 is configured to thermally isolate frictional heat from the rotor 110. In one embodiment, the channel 130 is milled into the body of rotor 110. In an alternative embodiment, the channel 130 is formed by linearly affixing hook-shaped members around the circumference of the rotor 110. In this embodiment, such hook-shaped members are typically welded or bolted in a radial arrangement to the body of the rotor 110. One advantage to such method of retrofitting the insert assembly 100 in the turbine, for example, is that the insert 140 is simply removed and replaced with another insert and down time of the turbine is thereby reduced. In some operations, such method of retrofitting the insert assembly 100 allows a technician to replace insert 140 without having to disassemble major parts of the rotary machine thereby reducing repair costs. Here, the insert 140 is typically fed tangentially into a radial opening in the channel 130 until the insert 140 wraps around the circumference of the rotor 110 so as to form an annular ring around the rotor 110. Subsequently, the end portions of insert 140 are then welded to each other or affixed to the rotor 110 by using fasteners. It will be appreciated that in other embodiments insert 140 comprises a plurality of insert segments that are disposed and affixed in the rotor 110 as discussed above.

It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall within the true spirit of the invention.

What is claimed is:

1. An insert assembly for a rotary machine, said rotary machine comprising a rotor and a casing, said rotor comprising a generally longitudinally-extending axis, said casing generally coaxially aligned with said axis, said casing circumferentially surrounding and radially spaced apart from said rotor, and said insert assembly comprising:

a channel circumferentially disposed on said rotor; and an insert circumferentially disposed in said channel wherein said channel comprises a hook-shapad lip extending above the surface of the rotor for securing said insert therein and said insert assembly is configured to thermally isolate frictional heat from said rotor to said insert.

2. The insert assembly of claim 1, wherein said rotary machine is a turbomachine.

3. The insert assembly of claim 1, wherein said rotary machine is selected from the group consisting of electric generators, steam turbines and gas turbines.

4. The insert assembly of claim 1, wherein said insert further comprises a ledge for securing said insert to said lip in said channel.

5. The insert assembly of claim 1, wherein said insert further comprises a plurality of insert tabs extending radially therefrom wherein said insert tabs are configured to be matingly disposed with a plurality of rotor tabs extending from said channel.

6. The insert assembly of claim 1, wherein said insert is a continuous insert.

7. The insert assembly of claim 1, wherein said insert comprises multiple insert segments disposed circumferentially in said channel around said rotor.

8. The insert assembly of claim 1, wherein said insert comprises a nickel based alloy.

9. The insert assembly of claim 1, wherein said insert is disposed adjacent a brush seal.

10. The insert assembly of claim 1, wherein said insert comprises a nickel-chromium-molybdenum alloy.

11. The insert assembly of claim 10, wherein said insert further comprises niobium.

12. A turbine comprising:
a turbine rotor comprising a generally longitudinally extending axis;
a turbine casing generally coaxially aligned wit said axis, said casing circumferentially surrounding and radially spaced from said rotor;
a channel circumferentially disposed on said rotor; and
an insert circumferentially disposed in said channel wherein said channel comprises a hook-shaped lip extending above the surface of the rotor for securing said insert therein and said insert assembly is configured to thermally isolate frictional heat from said rotor to said insert.

13. The turbine of claim 12, wherein said turbine is selected from the group consisting of steam turbines and gas turbines.

14. The turbine of claim 12, wherein insert further comprises a ledge for securing said insert to said lip in said channel.

15. The turbine of claim 12, wherein said insert further comprises a plurality of insert tabs extending radially therefrom wherein said insert tabs are configured to be matingly disposed with a plurality of rotor tabs extending from said channel.

16. The turbine of claim 12, wherein said insert is a continuous insert.

17. The turbine of claim 12, wherein said insert comprises multiple insert segments disposed circumferentially in said channel around said rotor.

18. The turbine of claim 12, wherein said insert comprises a nickel based alloy.

19. The turbine of claim 12, wherein said insert is disposed adjacent a brush seal.

20. The turbine of claim 12, wherein said insert comprises a nickel-chromium-molybdenum alloy.

21. The turbine of claim 20, wherein said insert further comprises niobium.

22. A method of retrofitting an insert assembly in a turbine, said turbine comprising a turbine rotor and a turbine casing, said rotor comprising a generally longitudinally-extending axis, said casing generally coaxially aligned with said axis, said casing circumferentially surrounding and radially spaced apart from said rotor, and said method of retrofitting comprising:
forming a channel on said rotor; and
disposing an insert in said channel wherein said channel comprises a hook-shaped lip extending above the surface of the rotor for securing said insert therein and said insert assembly is configured to thermally isolate frictional heat from said rotor to said insert.

23. The method of claim 22, wherein forming a channel comprises milling said channel into said rotor.

24. The method of claim 22, wherein disposing said insert in said channel comprises disposing said insert tangentially into a radial opening in said channel until said insert wraps around the circumference of the rotor so as to form an annular ring around said rotor.

25. The method of claim 22, wherein disposing said insert in said channel comprises disposing multiple segments around the circumference of said channel so as to form an annular ring around said rotor.

* * * * *

UNITED STATES PATENT AND TRADEMARK OFFICE
CERTIFICATE OF CORRECTION

PATENT NO. : 6,692,228 B2
DATED : February 17, 2004
INVENTOR(S) : Norman Arnold Turnquist et al.

It is certified that error appears in the above-identified patent and that said Letters Patent is hereby corrected as shown below:

<u>Column 5,</u>
Line 2, replace "hook-shapad" with -- hook-shaped --.

Signed and Sealed this

Fifteenth Day of June, 2004

JON W. DUDAS
*Acting Director of the United States Patent and Trademark Office*